US010309844B2

United States Patent
Kawamura (10) Patent No.: US 10,309,844 B2
(45) Date of Patent: Jun. 4, 2019

(54) PRESS DETECTING SENSOR (71) Applicant: Murata Manufacturing Co., Ltd., Nagaokakyo-shi, Kyoto-fu (JP)

(72) Inventor: Hideki Kawamura, Nagaokakyo (JP)

(73) Assignee: MURATA MANUFACTURING CO., LTD., Nagaokakyo-Shi, Kyoto-Fu (JP)

(*) Notice: Subject to any disclaimer, the term of this patent is extended or adjusted under 35 U.S.C. 154(b) by 205 days.

(21) Appl. No.: 15/052,149

(22) Filed: Feb. 24, 2016

(65) Prior Publication Data

US 2016/0169753 A1 Jun. 16, 2016

Related U.S. Application Data (63) Continuation of application No. PCT/JP2014/074353, filed on Sep. 16, 2014.

(30) Foreign Application Priority Data

Sep. 20, 2013 (JP) .................. 2013-195144

(51) Int. Cl.
*G01L 1/16* (2006.01)
*C09J 133/00* (2006.01)
*C09J 201/00* (2006.01)

(52) U.S. Cl.
CPC .............. *G01L 1/16* (2013.01); *C09J 133/00* (2013.01); *C09J 201/00* (2013.01)

(58) Field of Classification Search
CPC .......... G01L 1/16; C09J 133/00; C09J 201/00
See application file for complete search history.

(56) References Cited

U.S. PATENT DOCUMENTS

| 7,161,588 | B2 | 1/2007 | Nakanishi et al. |
| 2004/0017363 | A1 | 1/2004 | Nakanishi et al. |
| 2013/0005910 | A1* | 1/2013 | Okamoto ............... C09J 7/0217 525/205 |
| 2013/0027339 | A1* | 1/2013 | Kodani .................... G01L 1/16 345/173 |

(Continued)

FOREIGN PATENT DOCUMENTS

| CN | 1462384 A | 12/2003 |
| CN | 102165400 A | 8/2011 |

(Continued)

OTHER PUBLICATIONS

International Search Report issue for PCT/JP2014/074353, dated Oct. 14, 2014.

(Continued)

*Primary Examiner* — David Z Huang
(74) *Attorney, Agent, or Firm* — Arent Fox LLP (57) ABSTRACT

A press detecting sensor that includes an operation receiving member and a piezoelectric sensor. The operation receiving member is a multilayer rigid plate including a cover glass, a touch sensor and a display panel fixed via first bonding agents. The piezoelectric sensor includes a piezoelectric film, a first detecting member on a surface at a side of the operation receiving member of the piezoelectric film, and a second detecting member on a surface at a side opposite to the operation receiving member. The first detecting member is bonded to the operation receiving member by an adhesive member, and is bonded to the piezoelectric film by a second bonding agent.

9 Claims, 4 Drawing Sheets (56) References Cited

U.S. PATENT DOCUMENTS

| | | | | |
|---|---|---|---|---|
| 2013/0033452 A1* | 2/2013 | Fukushima | ......... | G02F 1/13338 345/174 |
| 2013/0251969 A1* | 9/2013 | Sasaki | ............... | G02F 1/133308 428/214 |
| 2014/0049137 A1 | 2/2014 | Ando et al. | | |
| 2014/0331791 A1* | 11/2014 | Ishii | ....................... | G01B 7/003 73/862.625 |

FOREIGN PATENT DOCUMENTS

| | | |
|---|---|---|
| JP | H05-61592 A | 3/1993 |
| JP | 2011-222679 A | 11/2011 |
| JP | 2012-173895 A | 9/2012 |
| WO | WO 2010/038466 A1 | 4/2010 |
| WO | WO 2012/137897 A1 | 10/2012 |
| WO | WO 2013/111670 A1 | 5/2015 |

OTHER PUBLICATIONS

Written Opinion of the International Searching Authority issue for PCT/JP2014/074353, dated Oct. 14, 2014.

\* cited by examiner

AT HIGH TEMPERATURE

FIG. 3(B)

AT LOW TEMPERATURE

DLG20L<<DLG20H
DLP20L ≈ DLG20L
DLP20L ≈ DLP20H

PRESS DETECTING SENSOR

CROSS REFERENCE TO RELATED APPLICATIONS

The present application is a continuation of International application No. PCT/JP2014/074353, filed Sep. 16, 2014, which claims priority to Japanese Patent Application No. 2013-195144, filed Sep. 20, 2013, the entire contents of each of which are incorporated herein by reference.

FIELD OF THE INVENTION

The present invention relates to a press detecting sensor which detects a pressing force for pressing an operation surface.

BACKGROUND OF THE INVENTION

Conventionally, various operation detecting sensors which detect an operator's operation on an operation surface have been devised. The operation detecting sensors include a capacitance type, a thermal resistance type, a piezoelectric acoustic type and an infrared sensor type. To detect a pressing force on an operation surface, it is necessary to install another press detecting sensor different from these operation detecting sensors.

Patent Literature 1 describes a touch input device which includes a touch panel which is an operation detecting sensor, and a pressure-sensitive sensor which detects a press on an operation surface. In the touch input device according to Patent Literature 1, the pressure-sensitive sensor is disposed on a surface of a lower side of the touch panel (a surface at a side opposite to the operation surface), and has the same area as that of the touch panel. Further, in the touch input device according to Patent Literature 1, a protection layer is disposed at a side of the operation surface of the touch panel.

In this case, the pressure-sensitive sensor receives a stress in response to a press on the operation surface via the protection layer and the touch sensor, and detects a pressing force corresponding to the press.

PTL 1: Japanese Patent Application Laid Open No. 5-61592

SUMMARY OF THE INVENTION

According to a configuration described in Patent Literature 1, it is necessary to bond the protection layer and the touch sensor, and also bond the touch sensor and the pressure-sensitive sensor, and bond the respective portions by adhesive members.

When such an operation detecting sensor is an operation detecting sensor which includes a protective layer having translucency, an acrylic bonding agent having high translucency is usually used for an adhesive member which bonds the protection layer and the touch sensor.

Figure 5:
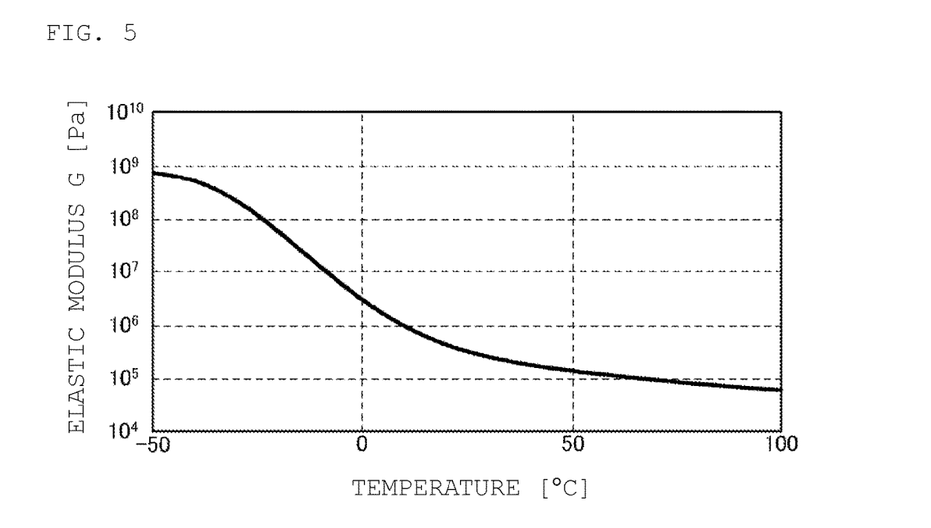
FIG. 5 is a graph illustrating temperature characteristics of an elastic modulus of a bonding agent.

This bonding agent usually has a glass transition point of about −10° C. to −50° C., and elastic moduli are significantly differ for temperatures lower and higher than this temperature. FIG. 5 is a graph illustrating temperature characteristics of an elastic modulus of a bonding agent. As illustrated in FIG. 5, an elastic modulus at a lower temperature than the vicinity of a glass transition point is substantially higher than an elastic modulus at a higher temperature than the vicinity of the glass transition point.

Figure 6:
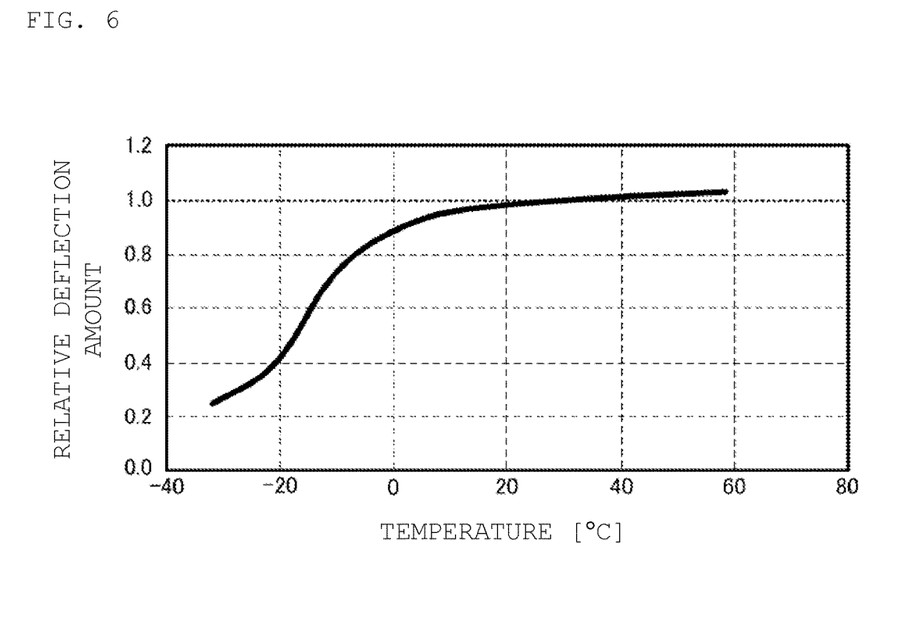
FIG. 6 is a graph illustrating temperature characteristics of a deflection amount of a multilayer member.

Hence, even when an operation surface (protection layer) is pressed with the same pressing force, a deflection amount of a multilayer member in which a protection layer and a touch sensor are bonded by a bonding agent substantially differs between a state of a lower temperature than the vicinity of the glass transition point and a state of a higher temperature than the glass transition point. FIG. 6 is a graph illustrating temperature characteristics of the deflection amount of the multilayer member. As illustrated in FIG. 6, when an operation surface is pressed with the same pressing force, a deflection amount of a higher temperature than the vicinity of the glass transition point is substantially larger than a deflection amount of a lower temperature than the vicinity of the glass transition point (e.g. about four times in FIG. 6).

Hence, a press detection value of the pressure-sensitive sensor at the higher temperature than the vicinity of the glass transition point is substantially higher than a press detection value of the pressure-sensitive sensor at the lower temperature than the vicinity of the glass transition point.

An object of the present invention is to provide a press detecting sensor which does not have temperature dependency and can provide a detection value corresponding to a pressing force.

The present invention relates to a press detecting sensor which includes an operation receiving member and a piezoelectric sensor. The operation receiving member is a flat member formed of a plurality of rigid plates laminated and bonded together with a first adhesive, and the operation receiving member has a first principal surface that is orthogonal to a laminating direction and serves as an operation surface. The piezoelectric sensor is disposed at a side of a second principal surface of the operation receiving member, and at a position to which a stress applied to the operation receiving member is transmitted to the piezoelectric sensor. Further, the piezoelectric sensor includes a piezoelectric film and detection electrodes on both principal surfaces of the piezoelectric film. The detection electrode at a side of the operation receiving member and the piezoelectric film is bonded to the piezoelectric film by a second bonding agent.

According to this configuration, when a difference in deflection of the operation receiving member is produced according to a temperature, an elastic modulus of a bonding agent (second bonding agent) of the piezoelectric sensor also changes according to a temperature. Hence, the difference in deflection of the operation receiving member caused by a change in temperature is alleviated by a change in temperature of the elastic modulus of the bonding agent of the piezoelectric sensor. Consequently, it is possible to suppress the amount of change in deflection amount of the piezoelectric film, i.e., the amount of change in stress to be applied to the piezoelectric film according to a temperature.

Further, preferably, in the press detecting sensor according to the present invention, the piezoelectric sensor is bonded to the other principal surface of the operation receiving member.

According to this configuration, the piezoelectric sensor can directly receive the stress produced by the deflection of the operation receiving member, and press detection sensitivity can be increased.

Further, preferably, in the press detecting sensor according to the present invention, the first bonding agent and the second bonding agent are made of a same material.

According to this configuration, it is easy to more accurately alleviate a difference in deflection of the operation receiving member produced by a difference in temperature.

Further, preferably, in the press detecting sensor according to the present invention, the first bonding agent and the second bonding agent are acrylic bonding agents. This configuration is suitable when the operation receiving member is required to have translucency, since the acrylic bonding agent which can easily achieve high translucency is used.

Further, in the press detecting sensor according to the present invention, the piezoelectric film preferably includes polylactic acid. According to this configuration, it is possible to detect deflection with high sensitivity.

Further, preferably, in the press detecting sensor according to the present invention, the operation receiving member includes a cover glass whose one principal surface serves as the operation surface, and a position detecting sensor of a flat shape which is disposed on a side of the other principal surface of the cover glass. According to this configuration, the operation receiving member can detect an operation position.

Further, in the press detecting sensor according to the present invention, the operation receiving member may further include a display panel which is disposed on a surface at a side opposite to the cover glass of the position detecting sensor. According to this configuration, a touch panel having a display function can be obtained with use of the operation receiving member.

According to the present invention, it is possible to obtain a fixed press detection value which is not influenced by a temperature, according to a pressing force on an operation surface.

DETAILED DESCRIPTION OF THE INVENTION

Figure 1:
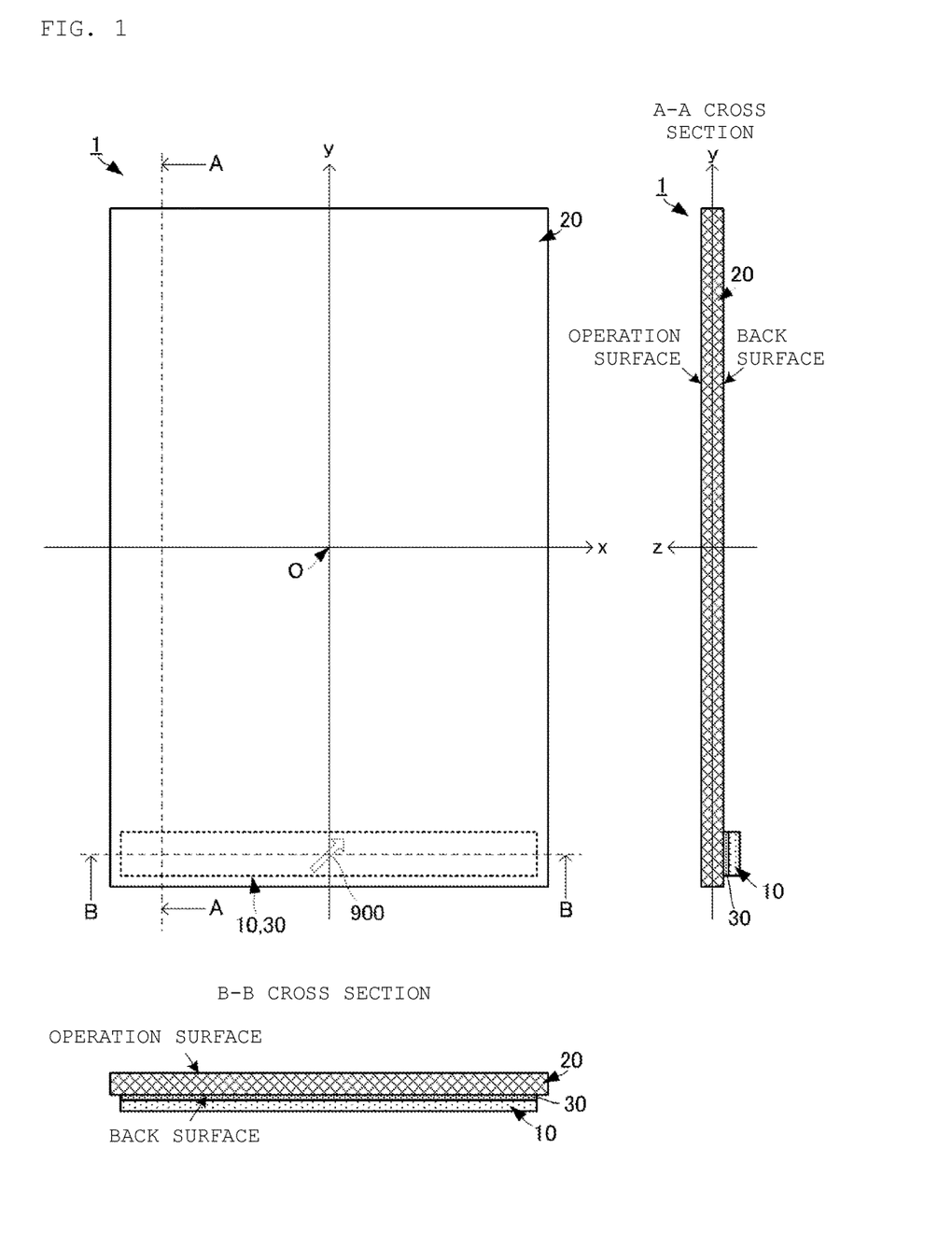
FIG. 1 illustrates a plan view and side sectional views of a press detecting sensor according to an embodiment of the present invention.
Figure 2:
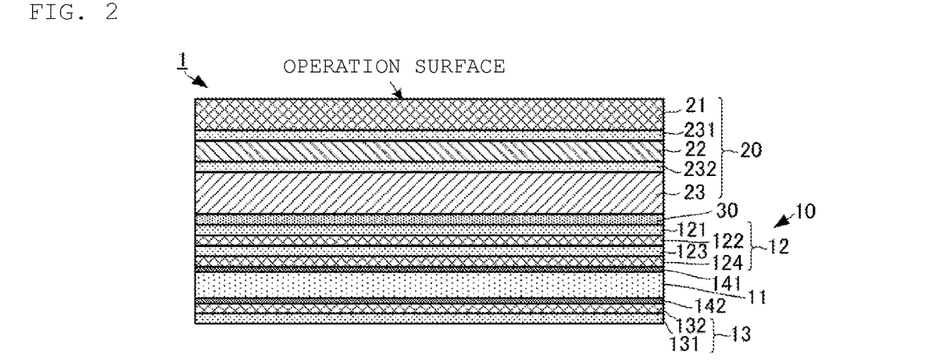
FIG. 2 is a view illustrating a specific layer configuration of an operation receiving member and a piezoelectric sensor according to the embodiment of the present invention.

A press detecting sensor according to the embodiment of the present invention will be described with reference to the drawings. FIG. 1 illustrates a plan view of the press detecting sensor according to the embodiment of the present invention, and side sectional views illustrating a schematic configuration of the press detecting sensor. FIG. 1 does not illustrate a specific layer configuration of an operation receiving member and a piezoelectric sensor, and FIG. 2 illustrates the specific layer configuration of the operation receiving member and the piezoelectric sensor. FIG. 2 is a view illustrating the specific layer configuration of the operation receiving member and the piezoelectric sensor according to the embodiment of the present invention.

As illustrated in FIG. 1, a press detecting sensor 1 includes a piezoelectric sensor 10, an operation receiving member 20 and an adhesive member 30. The operation receiving member 20 is made of a rectangular flat plate. At least both ends of the operation receiving member 20 in a lateral direction are fixed to a rigid body such as a housing which is not illustrated. In this regard, a substantially entire length along a longitudinal direction of edges which form the both ends of the operation receiving member 20 in the lateral direction is preferably fixed to the rigid body such as the housing.

The piezoelectric sensor 10 is a flat film of an elongated shape. The piezoelectric sensor 10 is bonded to a back surface of the operation receiving member 20 by the adhesive member 30. The adhesive member 30 is an adhesive. The adhesive member 30 is provided on a substantially entire surface of the piezoelectric sensor 10 which contacts the operation receiving member 20.

In the present embodiment, an adhesive member whose elastic modulus is $10^8$ Pa to $10^9$ Pa in a range of about −30° C. to about +60° C. is referred to as an adhesive. In contrast, an adhesive member whose elastic modulus at normal temperature is substantially low compared to an elastic modulus at a low temperature, for example, an adhesive member whose elastic modulus is about $10^4$ Pa to $10^6$ Pa at normal temperature (about 25° C.) is referred to as a bonding agent.

The piezoelectric sensor 10 is bonded to the vicinity of one end of the operation receiving member 20 in the longitudinal direction. In this regard, the piezoelectric sensor 10 is bonded to the operation receiving member 20 such that the longitudinal direction of the piezoelectric sensor 10 is parallel to the lateral direction of the operation receiving member 20.

Such a configuration is employed so that, when the operation receiving member 20 is deflected by a press on an operation surface, the piezoelectric sensor 10 also deflects. That is, a stress produced by the deflection of the operation receiving member 20 caused by the press on the operation surface is transmitted to the piezoelectric sensor 10, too, via the adhesive member 30, and a stress produced by the press on the operation surface is applied to the piezoelectric sensor 10. The piezoelectric sensor 10 produces a detected voltage according to the stress produced by this deflection. By obtaining this detected voltage, it is possible to detect a press. Further, a value of this detected voltage is uniquely determined based on a press amount, i.e., a pressing force. Consequently, by obtaining this detected voltage value, it is possible to detect the pressing force.

Next, a specific configuration of the operation receiving member 20 and the piezoelectric sensor 10 will be described with reference to FIG. 2.

In the operation receiving member 20, a cover glass 21, a position detecting sensor 22 and a display panel 23 are laminated along a thickness direction. The cover glass 21, the position detecting sensor 22 and the display panel 23 correspond to "rigid plates" according to the present description. The cover glass 21, the position detecting sensor 22 and the display panel 23 have rectangular shapes and are laminated such that respective principal surfaces overlap. In this regard, a surface of the cover glass 21, i.e., a surface at a side to which the position detecting sensor 22 is not bonded, serves as the operation surface of the operation receiving member 20.

The cover glass 21 and the position detecting sensor 22 are bonded via a bonding agent 231. The bonding agent 231 is provided on substantially entire surfaces of opposing principal surfaces of the cover glass 21 and the position detecting sensor 22. The position detecting sensor 22 and the display panel 23 are bonded via a bonding agent 232. The bonding agents 231 and 232 are desirably acrylic bonding agents. The acrylic bonding agent has high translucency, so that it is possible to efficiently display a display image of the display panel 30 on the operation surface.

The piezoelectric sensor 10 includes a piezoelectric film 11, a first detecting member 12 and a second detecting member 13.

The piezoelectric film 11 is made of polylactic acid (PLA), more specifically, poly-L-lactic acid (PLLA), and is a flat film of an elongated shape. An orientation direction 900 of molecules of the piezoelectric film 11 forms 45° with respect to the longitudinal direction and the lateral direction of the piezoelectric film 11. In other words, a uniaxial stretching direction of the piezoelectric film 11 forms 45° with respect to the longitudinal direction and the lateral direction of the piezoelectric film 11.

Hereinafter, characteristics of the PLLA from which the piezoelectric film 11 is made will be described.

The PLLA is made of a chiral polymer. The PLLA has a main chain of a spiral structure. The PLLA includes molecules oriented in a direction in which the PLLA is uniaxially stretched, and exhibits piezoelectricity according to an orientation of the molecules. Further, when the piezoelectric film 11 is distorted, the uniaxially stretched PLLA produces electric charges. In this regard, the distortion of the piezoelectric film 11 means that the piezoelectric film 11 is stretched in a predetermined direction. In this regard, an electric charge amount to be produced is determined based on a distortion amount of the piezoelectric film 11. A piezoelectric constant of the uniaxially stretched PLLA belongs to a group of very high piezoelectric constants among polymers. For example, a piezoelectric distortion constant $d_{14}$ of the PLLA can take a high value such as 10 to 20 pC/N by controlling stretching conditions, heat processing conditions and conditions relating to additive mixing.

Further, when the piezoelectric sensor 10 is bonded to the operation receiving member 20 as described above, a direction in which the piezoelectric film 11 is deflected and stretched by a stress of a press and the uniaxial stretching direction form approximately 45°. Consequently, it is possible to effectively convert the press into electric charges.

A stretching ratio of the piezoelectric film 11 is preferably about 3 to 8. By performing heating treatment after performing stretching, crystallization of extended chain crystal of polylactic acid is accelerated, and the piezoelectric constant improves. When biaxial stretching is performed, it is possible to provide the same effect as that of uniaxial stretching by employing different stretching ratios for respective axes. When, for example, a given direction is an X axis and the film is stretched to eight times the film in an X axis direction, and the film is stretched to twice the film in a Y axis direction orthogonal to the X axis, it is possible to provide substantially the same effect in terms of the piezoelectric constant as an effect obtained when the film is subjected to uniaxial stretching to be stretched to four times the film in the X axis direction. Simply uniaxially stretched film is likely to break in a stretching axial direction. Consequently, by performing biaxial stretching as described above, it is possible to increase the strength to some degree.

Further, the PLLA exhibits piezoelectricity as a result of molecular orientation treatment by stretching, and does not need to be subjected to poling treatment unlike other polymers such as PVDF or piezoelectric ceramic. That is, the piezoelectricity of the PLLA which does not belong to ferroelectrics is exhibited not by ion polarization as in ferroelectrics such as PVDF or PZT, but derives from a spiral structure which is a characteristic structure of molecules. Hence, although PVDF fluctuates in piezoelectric constant with time due to depolarization and the piezoelectric constant significantly lowers in some cases, a piezoelectric constant of the PLLA is very stable over time. Hence, an output electric charge amount is not influenced by surrounding environment. Further, since the PLLA does not exhibit pyroelectricity unlike other ferroelectric piezoelectric bodies, a change in temperature is less likely to cause erroneous detection.

The first detecting member 12 includes base films 121 and 123 and electrodes 122 and 124. The base films 121 and 123 are insulating films which are made of a material having flexibility such as polyimide. The electrode 122 is a conductive film of a high conductivity such as a copper foil, and is formed on a principal surface of the base film 121. The electrode 124 is a conductive film of a high conductivity such as a copper foil, and is formed on a principal surface of the base film 123. In this regard, the base films 121 and 123 are formed to have wider areas than that of the piezoelectric film 11, and the electrodes 122 and 124 are formed to have substantially the same areas as that of the piezoelectric film 11 and have smaller areas than that of the piezoelectric film 11.

The base film 121 on which the electrode 122 has been formed and the base film 123 on which the electrode 124 has been formed are laminated such that the base film 121, the electrode 122, the base film 123 and the electrode 124 are disposed in order. This multilayer body composes the first detecting member 12.

The first detecting member 12 is bonded to the piezoelectric film 11 via a bonding agent 141 such that the electrode 124 contacts the piezoelectric film 11. In this regard, the first detecting member 12 is bonded to the piezoelectric film 11 such that the electrodes 122 and 124 overlap the piezoelectric film 11. The bonding agent 141 is made of the same material as that of the above bonding agents 231 and 232.

The second detecting member 13 includes a base film 131 and an electrode 132. The base film 131 is an insulating film which is made of a material having flexibility such as polyimide. The electrode 132 is a conductive film of a high conductivity such as a copper foil, and is formed on a principal surface of the base film 131. In this regard, the base film 131 is formed to have a wider area than that of the piezoelectric film 11, and the electrode 132 is formed to have substantially the same area as that of the piezoelectric film 11 and have a smaller area than that of the piezoelectric film 11.

The second detecting member 13 is bonded to the piezoelectric film 11 via a bonding agent 142 such that the electrode 132 contacts the piezoelectric film 11. In this regard, the first detecting member 12 is bonded to the piezoelectric film 11 such that the electrodes 122 and 124 overlap the piezoelectric film 11. The bonding agent 142 is made of the same material as that of the above bonding agents 141, 231 and 232.

By employing such a configuration, the electrodes 124 and 132 can detect electric charges produced when a stress of deflection is applied to the piezoelectric film 11 and the piezoelectric film 11 is stretched. Since these electrodes 124 and 132 detect the electric charges, it is possible to obtain the above detected voltage.

The electrode 122 and the base film 121 on which the electrode 122 is formed can be omitted. However, by connecting the electrode 122 to a ground potential, it is possible to shield noise from an operation surface side, and accurately obtain a detected voltage value produced by a press.

Figure 3A:
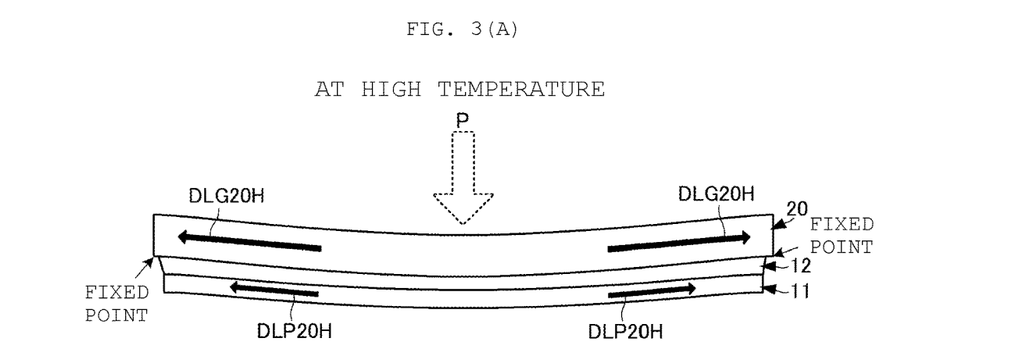
FIGS. 3(A) and 3(B) are views schematically illustrating how each portion is deflected in the case where the operation surface of the press detecting sensor according to the embodiment of the present invention is pressed.
Figure 3B:
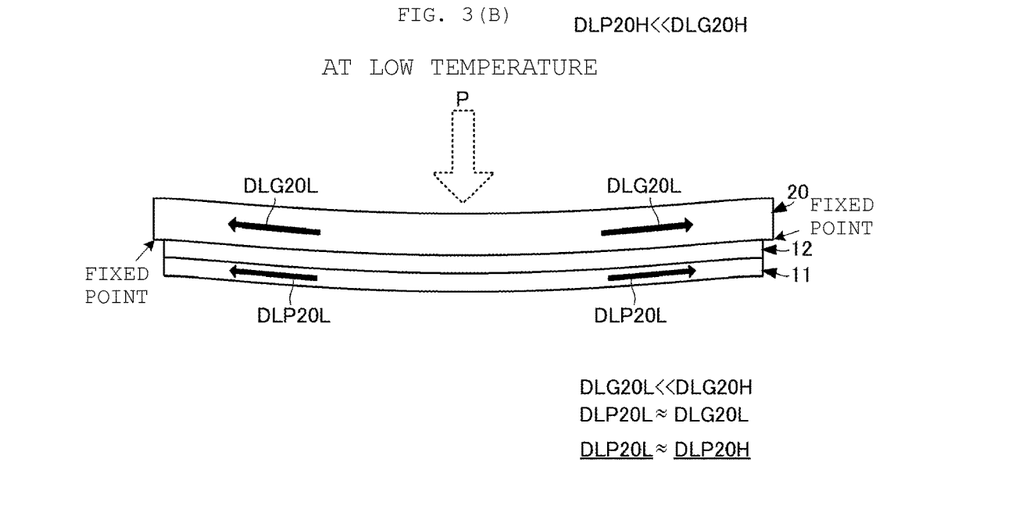

By using the above configuration, a pressing force is detected according to a temperature as follows. FIGS. 3(A) and 3(B) are views schematically illustrating how each portion is deflected when the operation surface is pressed. FIG. 3(A) illustrates a state of a high temperature, and FIG. 3(B) illustrates a state of a low temperature. FIGS. 3(A) and 3(B) illustrate a state where a center of the operation receiving member 20 in the lateral direction is pressed while the both ends of the operation receiving member 20 in the lateral direction serve as fixed points.

The high temperature in the first embodiment is a higher temperature than a glass transition point of a bonding agent, and the low temperature is a lower temperature than a glass transition point of the bonding agent. In FIGS. 3(A) and 3(B), a pressing force P is the same.

(At High Temperature)

As illustrated in FIG. 3(A), elastic moduli of the bonding agents 231 and 232 which compose the operation receiving member 20 are low at high temperature. Therefore, when the operation surface is pressed with the pressing force P, the operation receiving member 20 produces great deflection DLG20H. The stress produced by the deflection DLG20H of this operation receiving member 20 transmits to the first detecting member 12 bonded to the operation receiving member 20 by the adhesive member 30, and further transmits to the piezoelectric film 11 bonded to the first detecting member 12 by the bonding agent 124.

In this regard, the first detecting member 12 is bonded to the piezoelectric film 11 by the bonding agent 141, and the elastic modulus of the bonding agent 141 is also low. Consequently, the stress produced by the deflection DLG20H of the operation receiving member 20 is alleviated, and the deflection DLP20H of the piezoelectric film 11 is substantially a little compared to the deflection DLG20H of the operation receiving member 20 (DLP20H<<DLG20H).

(At Low Temperature)

As illustrated in FIG. 3(B), the moduli of the bonding agents 231 and 232 which compose the operation receiving member 20 are high at low temperature. When the operation surface is pressed with the pressing force P, small deflection DLG20L of the operation receiving member 20 is produced. The deflection DLG20L of the operation receiving member 20 at the low temperature is substantially a little compared to the deflection DLG20H of the operation receiving member 20 at the high temperature (DLG20L<<DLG20H).

The stress produced by the deflection DLG20L of this operation receiving member 20 transmits to the first detecting member 12 bonded to the operation receiving member 20 by the adhesive member 30, and further transmits to the piezoelectric film 11 bonded to the first detecting member 12 by the bonding agent 124.

In this regard, the first detecting member 12 is bonded to the piezoelectric film 11 via the bonding agent 141, and the elastic modulus of the bonding agent 141 is also high. Consequently, the stress of the deflection DLG20H of the operation receiving member 20 is hardly alleviated, and deflection DLP20L of the piezoelectric film 11 is substantially the same as the deflection DLG20L of the operation receiving member 20 (DLP20L≈DLG20L).

Thus, when the operation receiving member 20 is relatively greatly deflected at a high temperature or when the operation receiving member 20 is relatively deflected a little at a low temperature, by using the configuration according to the present embodiment, the deflection of the piezoelectric film 11 is substantially the same (DLA20L≈DLA20H).

Consequently, when the operation surface is pressed with the same pressing force P, the electric charge amount produced by the piezoelectric film 11 is substantially the same without depending on a temperature, and a detected voltage value produced by the piezoelectric sensor 10 is substantially the same value.

Figure 4:
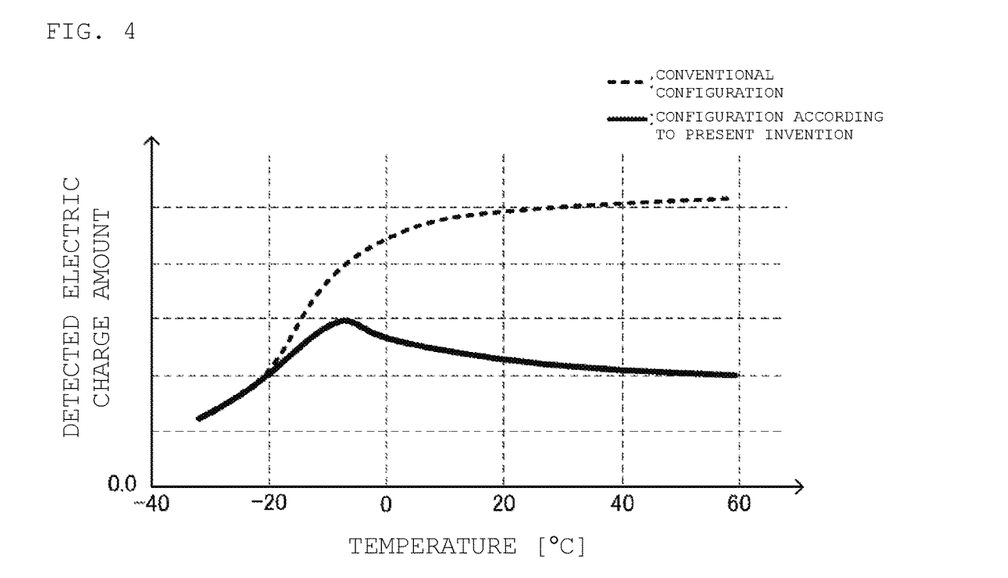
FIG. 4 is a graph illustrating temperature characteristics of an electric charge amount produced by a piezoelectric film of the press detecting sensor according to the embodiment of the present invention, and temperature characteristics of an electric charge amount produced by a piezoelectric film of a press detecting sensor according to a conventional configuration.

FIG. 4 is a graph illustrating temperature characteristics of an electric charge amount produced by a piezoelectric film of the press detecting sensor according to the embodiment of the present invention, and temperature characteristics of an electric charge amount produced by a piezoelectric film of a press detecting sensor according to a conventional configuration. FIG. 4 is a graph illustrating a detected electric charge amount when a pressing force is fixed and a temperature changes. In addition, the conventional configuration illustrated in FIG. 4 adopts a mode where a bonding agent of the first detecting member 12 is replaced with an adhesive.

As illustrated in FIG. 4, according to the conventional configuration, a detected electric charge amount significantly differs depending on a temperature. However, by using the configuration according to the present embodiment, a detected electric charge amount is almost fixed without depending on a temperature.

Thus, by using the configuration according to the present embodiment, it is possible to achieve a press detecting sensor which provides a press detection value which is not influenced by a temperature and depends only on a pressing force on the operation surface.

An attachment position of the piezoelectric sensor 10 to the operation receiving member 20 is not limited to the above position. The attachment position may be another position as long as the attachment position is a position in which a stress produced when the operation receiving member 20 is deflected by a press on the operation surface is received. Further, as long as the attachment position is a position to which a stress of deflection caused when the operation receiving member 20 is pressed transmits, the piezoelectric sensor 10 may be attached to another component which composes the press detecting sensor (e.g. a sheet-metal member disposed at a side of the back surface of the operation receiving member 20).

DESCRIPTION OF REFERENCE SYMBOLS

1: PRESS DETECTING SENSOR
10: PIEZOELECTRIC SENSOR
11: PIEZOELECTRIC FILM
12: FIRST DETECTING MEMBER
13: SECOND DETECTING MEMBER
20: OPERATION RECEIVING MEMBER
21: COVER GLASS
22: POSITION DETECTING SENSOR
23: DISPLAY PANEL
30: ADHESIVE MEMBER 231,232: BONDING AGENT
121,123,131: BASE FILM
122,124,132: ELECTRODE
141,142: BONDING AGENT

The invention claimed is:

1. A press detecting sensor comprising:
an operation receiving member having a plurality of plates laminated and bonded together with a first bonding agent, the operation receiving member having a first principal surface that is orthogonal to a laminating direction and a second principal surface opposite the first principal surface;
a piezoelectric sensor disposed at a side of the second principal surface of the operation receiving member, and positioned such that a stress from the operation receiving member is transmitted to the piezoelectric sensor, wherein
the piezoelectric sensor includes:
 a piezoelectric film having opposed first and second principal surfaces;
 a first detection electrode on the first principal surface of the piezoelectric film;
 a second detection electrode on the second principal surface of the piezoelectric film; and
 of the first and second detection electrodes, the detection electrode at a side of the operation receiving member is bonded to the piezoelectric film by a second bonding agent; and
an adhesive member which adheres the operation receiving member and the piezoelectric sensor to each other, wherein an elastic modulus of the adhesive member is higher than that of an elastic modulus of the first bonding agent and the second bonding agent.

2. The press detecting sensor according to claim 1, wherein the piezoelectric sensor is bonded to the second principal surface of the operation receiving member.

3. The press detecting sensor according to claim 1, wherein the first bonding agent and the second bonding agent are an acrylic bonding agent.

4. The press detecting sensor according to claim 3, wherein the elastic modulus of the first bonding agent and the second bonding agent is between $10^4$ to $10^6$ Pa at 25° C.

5. The press detecting sensor according to claim 1, wherein the piezoelectric film includes polylactic acid.

6. The press detecting sensor according to claim 1, wherein the plurality of plates of the operation receiving member include:
a glass plate having a first surface that defines the first principal surface of the operation receiving member and a second surface opposite the first surface; and
a position detecting sensor disposed at a side of the second surface of the glass plate.

7. The press detecting sensor according to claim 6, wherein the plurality of plates of the operation receiving member further include a display panel disposed at a side of the position detecting sensor such that the position detecting sensor is between the glass plate and the display panel.

8. The press detecting sensor according to claim 1, wherein the elastic modulus of the first bonding agent and the second bonding agent is between $10^4$ to $10^6$ Pa at 25° C.

9. The press detecting sensor according to claim 1, wherein the elastic modulus of the first bonding agent and the second bonding agent at room temperature is smaller than the elastic modulus of the adhesive member at a temperature lower than room temperature.

* * * * *